3,575,943
PROCESS FOR THE PREPARATION OF ACRYLONITRILE COPOLYMERS
Jozef L. M. van der Loos, Geleen, Johannes H. Ottenheym, Sittard, Franciscus A. Busschers, Geleen, and Peter J. M. W. Claassen, Amstenrade, Netherlands, assignors to Stamicarbon N.V., Heerlen, Netherlands
No Drawing. Filed June 25, 1969, Ser. No. 836,577
Claims priority, application Netherlands, June 25, 1968, 6808960
Int. Cl. C08f 15/36, 15/38, 15/40
U.S. Cl. 260—78.5
7 Claims

ABSTRACT OF THE DISCLOSURE

Copolymers having improved dyeing characteristics are prepared by copolymerizing acrylonitrile with the α-methylene glutaric acid, alone or in combination with the monohydrocarbyl ester thereof or with the ester alone in such amounts that the resulting copolymer comprises 0.1–10 percent by weight of said acid or ester, or combination thereof, and at least 35 percent by weight acrylonitrile.

---

This invention relates to a process for the preparation of copolymers which can be made into filaments or films and which comprise at least 35 percent by weight acrylonitrile and at least one other monomer to improve the dyeing characteristics of the copolymer.

It is known to incorporate certain monomers containing acidic or basic groups into copolymers as agents to improve the dyeing properties. According to the present invention, it has been found, unexpectedly, that α-methylene glutaric acid can be copolymerized with at least 35 percent acrylonitrile to improve the dyeing characteristics of the resulting copolymer. In a preferred embodiment of the present invention, the monohydrocarbyl ester of the α-methylene glutaric acid can be employed as the copolymer of the acrylonitrile, either as an alternative to the acid itself or in combination therewith. The use of α-methylene glutaric acid or the monohydrocarbyl ester thereof according to the present invention has the advantage that it is inexpensive and can be obtained in large amounts readily and easily, for example, from the dimerization and subsequent hydrolyses, with or without esterification, of acrylonitrile. Obvious advantages are therefore apparent since acrylonitrile is also the other monomer employed in the present invention. Further, the problem of unsaturation, associated with the use of itaconic acid or the mono-esters thereof, is not encountered.

It has been found that the inclusion of even small amounts of the monohydrocarbyl ester of α-methylene glutaric acid highly improves the dyeing characteristics of the copolymer. The mono-alkyl esters, containing 1–22 and in particular 1–4 carbon atoms in the alkyl group have been found to be most suitable. Cyclo-alkyl esters, e.g. cyclopentyl or cyclohexyl ester, and phenyl and benzyl esters, are also applicable in the process of this invention. Although the hydrocarbyl group may be bonded to each of the two carboxylic acid groups, it is preferred to use those esters in which the carboxylic acid group is not bonded to the vinylidene group which has been esterified. If desired, the hydrocarbyl group may contain substituents, e.g. halogen atoms. Small amounts of α-methylene glutaric acid also have been found to highly improve the dyeing characteristics of the polymer prepared with it. The polymer may, however, show some inclination to cross-linking, in which case gel particles may be formed and the polymer does not dissolve completely and homogeneously. These gel particles may interfere with the processing of the polymer, e.g. in causing trouble during the spinning process. By incorporating monomers, such as methylacrylate, methylmethacrylate or vinyl acetate, smaller amounts of the α-methylene glutaric acid may be used, e.g. less than 3.5% by weight, thereby eliminating the cross-linking hazard. If desired, the polymerization medium may therefore, in addition to acrylonitrile and the dyability-improving comonomer, contain other comonomers, such as unsaturated esters, e.g. methyacrylate, methyl - methacrylate or vinylacetate–vinylchloride, vinylidenechloride or styrene.

The polymerization is normally carried out in a liquid dispersing agent. The monomer mixture may be polymerized in a solvent like dimethylformamide, dimethylacetamide, dimethylsulphoxide, or a zinc chloride water mixture, but is is preferred to perform the polymerization in an aqueous dispersion, emulsion or solution of acrylonitrile. If so desired, the polymerization can be carried out in sufficient acrylonitrile that the acrylonitrile itself acts as the dispersing agent so that another dispersing agent need not be used. The liquid dispersing agent may contain the customary additives, such as soaps, e.g. sodium lauryl sulphonate, chain-controlling agents, e.g. dodecylmercaptan.

Normally, a free radical initiator is used as the catalyst, e.g. azoisobutyronitrile, lauroyl peroxide, hydrogen peroxide, di(tert. butyl-4-cyclohexyl) percarbonate or cumene hydroperoxide, or redox catalysts, such as potassium persulphate with sodium metabisulphite and, possibly, with ferrous compounds.

It is also possible to accelerate the polymerization by irradiation, e.g. with UV-radiation, or by means of anionic catalysts as butyl lithium. If so desired, other catalysts may be employed. The temperature at which the polymerization is carried out may be varied within wide limits, e.g. between −75 and +90° C.., but preferably between 20 and 70° C. The pressure is not critical; normally, the process is carried out at only slightly above atmospheric pressure. If it is desirable to work under a higher pressure, nitrogen for example may be passed into the polymerization medium. As a rule the process is carried out under oxygen-free conditions. Depending on the polymerization technique the polymerization time lies between a few minutes and about ten hours. The polymerization can also be carried out in one or several stages.

If the polymerization takes place in an aqueous medium, the acidity of the medium is controlled. Normally, this lies below 7, preferable between 1.5 and 3.5.

The concentration of the polymer depends on the type of dispersing agent used. In a solvent for the polymer the concentration of polymer may be fairly high, e.g. up to 40% by weight. In an aqueous solution the concentration is lower, e.g. 15% by weight or lower.

The polymers prepared according to the invention consist to at least 35 and preferably at least 85% by weight of acrylonirile, and to 0.1–10%, preferably 0.5–6% by weight of the dyability-improving monomer.

The molecular weight of the polymers is indicated by means of the intrinsic viscosity, which is determined on a solution of the polymer in dimethylformamide at 20° C. Normally, the intrinsic viscosity lies between 0.5 and 5 (dl/g.)

The polymers obtained according to the invention can be formed into articles of manufacture etc. by any suitable procedure, e.g. by injection moulding, compression moulding or extrusion. In particular, the polymer will be processed to filaments, e.g. by spinning of a melt, or a polymer solution. Other shaping techniques may also be employed. The polymers may be mixed with customary additives, such as heat stabilizers, UV-stabilizers, pigments, dyes, plasticizers, fillers, lubricants etc.

EXAMPLE 1

600 cc. of distilled, oxygen-free water was placed in a polymerization reactor under oxygen-free conditions. The pH of the water was reduced to about 2.5 by addition of dilute sulphuric acid, whereupon it was heated to the polymerization temperature of 55° C. After that, 1.2 g. sodium lauryl sulphonate, 2.1 mg. of Mohr salt, 0.6 g. of potassium persulphate, 0.2 g. of sodium metabisulphite, were added in succession, and, finally 28.5 g. of distilled acrylonitrile and 1.5 g. of the monoethyl ester of α-methylene glutaric acid. The mixture was then polymerized for 1 hour, with simultaneous stirring. After separation, washing and drying of the polymer, 26 g. of polymer with an intrinsic viscosity of 0.7 were obtained.

To evaluate the dyability, the polymer was dissolved in dimethyl formamide and processed to film. This film was treated for 15 minutes with an 0.5% by weight solution of a basic dye ("Astradiamant Grün CX"; C.I. 42040) in water. The dyed film was then washed in a boiling solution of a synthetic detergent ("T-pol") and subsequently washed in cold water for ½ h. The film thus treated was coloured deep green. Another experiment, carried out without application o fthe monoethyl ester of α-methylene glutaric acid, yielded a hardly dyed film.

EXAMPLE 2

When the process of Example 1 was carried out with application of a monomer mixture containing 94% by weight of acrylonitrile, 5% by weight of methylacrylate and 1% by weight of the monoethyl ester of α-methylene glutaric acid, a polymer was obtained (yield: 88%), which, notwithstanding the low content of mono-ethyl ester, showed an even better dyability than the polymer obtained in Example 1. The polymer had an intrinsic viscosity equal to 2.8.

EXAMPLE 3

Example 1 was repeated, with α-methylene glutaric acid being used instead of its mono-ester. The degree of conversion was 67%. The polymer showed some gel formation during dissolving in dimethyl formamide. The intrinsic viscosity equaled 4.

EXAMPLE 4

Example 1 was repeated, with 1.5 g. of mono-ethyl ester being used instead of 2.8 g. of a mixture consisting of the mono-ethyl and the di-ethyl ester of methylene glutaric acid in a 2:1 ratio. The dyability of the polymer was equal to that of the product obtained in Example 1. The presence of di-ethylesters in the polymerization medium had no harmful effect on the polymer.

The mono-ester can be prepared by reaction of α-methylene glutaric acid with an alcohol in the presence of dilute acid, e.g. sulphuric acid, at temperatures between 50 and 150° C., preferably between 70 and 110° C. Normally, the alcohol or phenol is used in amounts equivalent to the amount of acid, but excess amounts may also be employed. The reaction can be carried out in a distributing agent constituting an axeotrope with water, e.g. benzene. It has appeared that the amount of acid added determines the ratio between the amounts of mono-ester and di-ester formed. It was found e.g. that with 0.2 mole of sulphuric acid being present per 1 mole of α-methylene glutaric acid, the amounts of mono-ester and di-ester formed in the preparation of the ethylesters are in the ratio of approx 2:1.

It is claimed:

1. Process for the preparation of a copolymer having improved dyeing characteristics, whereby α-methylene glutaric acid comonomer or a mono-hydrocarbyl ester thereof or said acid and ester comonomers together are copolymerized with acrylonitrile in such amounts that the resulting copolymer comprises 0.1–10% by weight of said acid or ester comonomer or combination thereof and at least 35% by weight acrylonitrile.

2. Process according to claim 1, whereby an alkylester of α-methylene glutaric acid containing 1–4 carbon atoms in the alkyl group is used as the comonomer.

3. Process according to claim 1 or 2, whereby the polymerization is carried out in a liquid dispersing agent.

4. Dyeable filament or film forming copolymer comprising at least 35% by weight of acrylonitrile, 0.1–10% by weight of α-methylene glutaric acid and/or monohydrocarbyl ester of said acid.

5. Dyeable filament or film forming copolymer comprising at least 85% by weight of acrylonitrile, 0.5–6% by weight of α-methylene glutaric acid and/or a monohydrocarbyl ester of said acid.

6. Mold shaped objects consisting, in whole or in part, of a polymer according to claim 4.

7. Filaments consisting in whole or in part of a polymer according to claim 4.

References Cited

UNITED STATES PATENTS

| | | | |
|---|---|---|---|
| 2,734,888 | 2/1956 | D'Alelio | 260—45.7 |
| 3,511,810 | 5/1970 | Furrow | 260—63 |

JAMES A. SEIDLECK, Primary Examiner

J. KIGHT, Assistant Examiner

U.S. Cl. X.R.

8—55